INVENTOR.
RAYMOND SCOTT
BY
[signature]
ATTORNEY

AUTOMATIC TAPE TRANSPORTING AND POSITION SELECTING DEVICE

Filed Oct. 16, 1959 3 Sheets-Sheet 2

INVENTOR.
RAYMOND SCOTT

BY *[signature]*

ATTORNEY

Sept. 5, 1961 R. SCOTT 2,998,939

AUTOMATIC TAPE TRANSPORTING AND POSITION SELECTING DEVICE

Filed Oct. 16, 1959 3 Sheets-Sheet 3

INVENTOR.
RAYMOND SCOTT
BY

ATTORNEY

United States Patent Office 2,998,939

Patented Sept. 5, 1961

2,998,939

AUTOMATIC TAPE TRANSPORTING AND POSITION SELECTING DEVICE

Raymond Scott, Manhasset, N.Y.
(140 W. 57th St., New York, N.Y.)

Filed Oct. 16, 1959, Ser. No. 846,835
15 Claims. (Cl. 242—55.12)

The present invention relates generally to improvements in readout devices and it relates more particularly to an improved apparatus for automatically transporting a magnetic or other information carrying band or tape to any desired preselected point thereon and reading out or playing a selected portion of the tape.

The conventional automatic tape readout devices heretofore available are characterized by their high cost and complexity and the many problems which attend their use. It is not economical to employ such devices where cost is an important factor such as in juke boxes, radio broadcast studios, low cost automated machinery and in other applications where speed and accuracy are also desirable.

It is therefore a principal object of the present invention to provide an improved readout device.

Another object of the present invention is to provide and improved automatic tape readout device wherein the tape is automatically transported to any preselected point on the tape and a desired section thereof read out.

Still another object of the present invention is to provide an improved tape readout device in which the tape is rapidly advanced in a forward or reverse direction at a rapid speed and then advances at a normal playing speed.

A further object of the present invention is to provide a tape read out apparatus of the above nature which is rugged, simple and inexpensive and may be employed with the conventional tape transport deck.

The above and other objects of the present invention will become apparent from a reading of the following description taken in conjunction with the accompanying drawings wherein.

In one sense the present invention contemplates an apparatus for automatically transporting a tape to any preselected point by generating a signal responsive to said preselected point and the relative position of the tape, actuating the tape transport mechanism to convey the tape in a direction in accordance with said signal and then advancing the tape in a forward direction at a normal playing speed. According to the preferred form of the present invention the tape is transported to a point trailing the preselected point at a rapid speed and is then advanced to the selected point at playing speed and the readout circuit is actuated upon said preselected point being reached. Several arrangements for achieving the above sequence will be hereinafter set forth.

Figure 1:
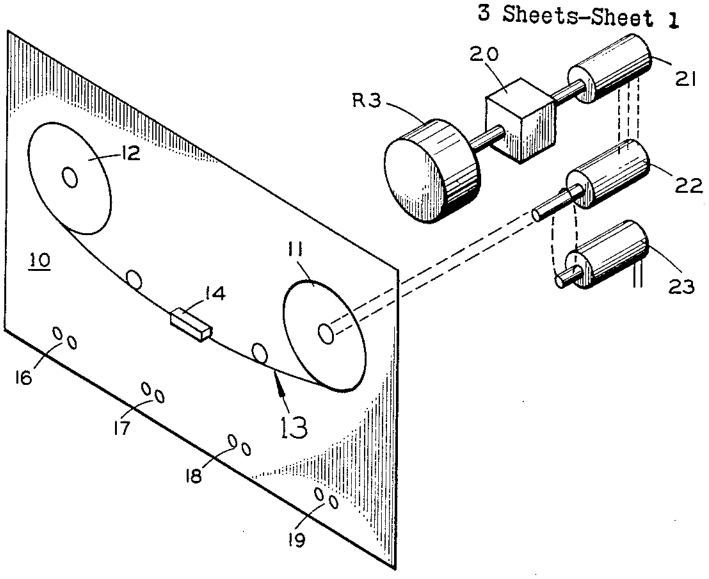
FIGURE 1 is a plan diagrammatic view of a conventional tape transport deck and certain associated components in accordance with the present invention.
Figure 2:
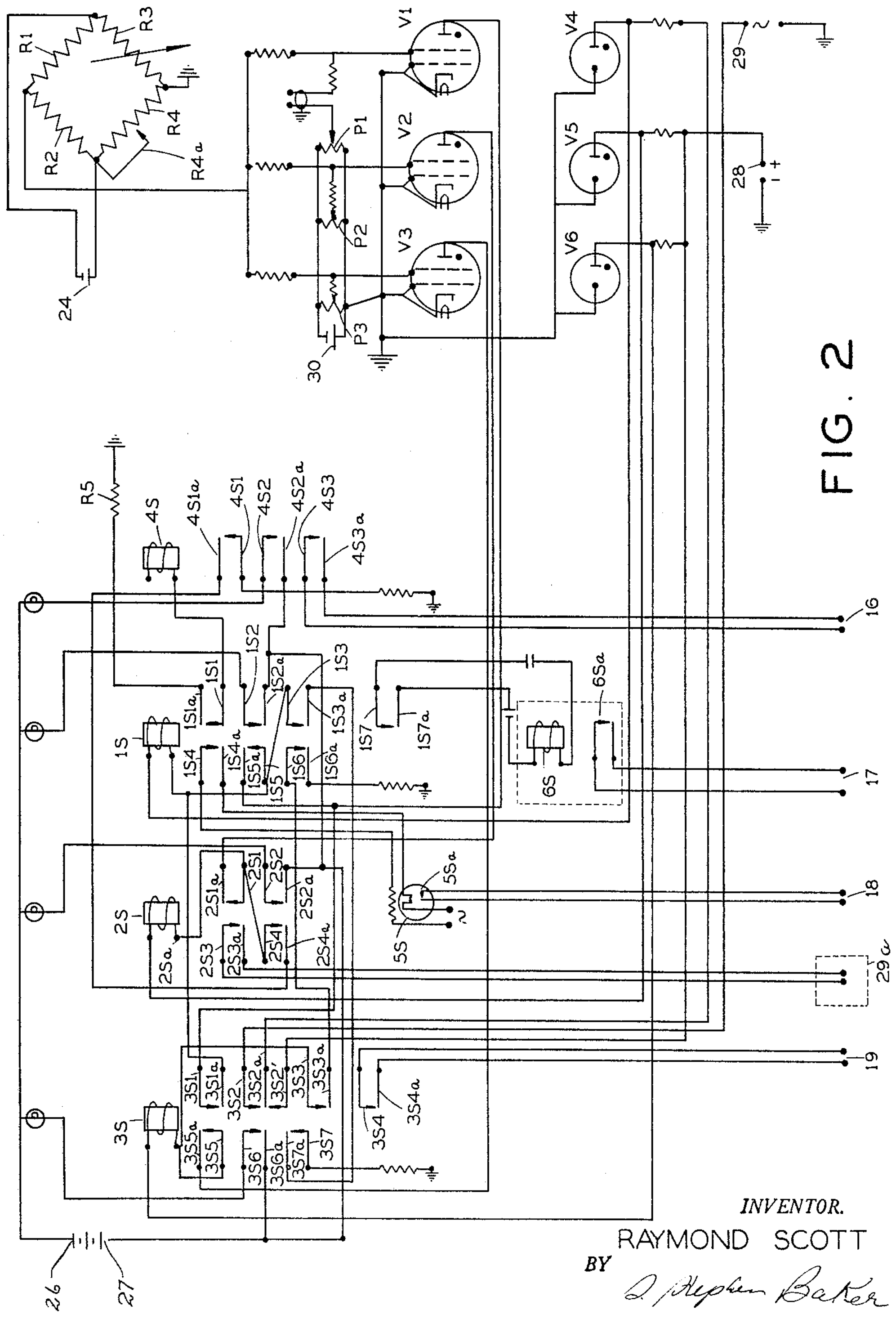
FIGURE 2 is a schematic view of a circuit network embodying the present invention and employed with the apparatus illustrated in FIGURE 1.

Referring now to the drawings and more particularly to FIGURES 1 and 2 thereof which illustrate a preferred embodiment of the present invention the reference numeral 10 generally designates a conventional type tape transport deck which includes spindle supported take up and feed reels 11 and 12 respectively which store a length of recorded tape 13 and transport it past a pickup 14. The tape transport is selectively motor driven in the usual manner at a rapid wind, rapid rewind, and normal playing forward speeds and may also be stopped, shifting between speeds being effected only by way of an intervening stopping of the transport. The deck 10 is provided with rapid wind, stop, normal, forward, and rapid rewind pairs of terminals 16, 17, 18 and 19 respectively, the interconnection or pulsing of any pair effecting the corresponding actuation of the tape transport.

In order to generate a control signal in accordance with the relative positions of the tape 13 and the preselected point thereon, there is provided a bridge network including a pair of connected fixed resistor arms R1 and R2, between the ends of which are connected series connected control rheostat R3 and multitapped selector resistor R4. An arm R4*a* is associated with resistor R4 and varies the value thereof in stepped increments by shorting out selected portions. The arm of the rheostat R3 is mechanically connected by way of a speed reducing gear train to the shaft of a Selsyn synchronous receiver 21 which in turn is coupled to a Selsyn transmitter 22. The shaft of the Selsyn transmiter 22 is positively driven in synchronism with the take up reel 11 so that the resistance of the rheostat R3 varies in accordance with the position of the tape 13. A D.C. generator 23 is also driven in synchronism with the reel 11 to produce a voltage of a polarity corresponding to the direction of rotation of the reel 11 and a value in accordance with the speed thereof. A source of D.C. voltage 24 is connected between the outer ends of resistors R1 and R2, the control voltage being picked off at their junction point, the opposite corner of the bridge being grounded.

The principal control network includes three main solenoid actuated relays 1S, 2S and 3S and associated grid controlled gas discharge tubes V1, V2 and V3. It should be noted that the tubes V1, V2 and V3 are of the two grid type and that the normal control grids are connected to the cathodes which in turn are grounded and the second grids are employed as the control grids and will be hereinafter so designated. Actuated by the energized relay 1S are the normally closed contacts and arms 1S1 and 1S1*a*, and 1S5 and 1S5*a* and the normally open contacts and arms 1S2 and 1S2*a*, 1S3 and 1S3*a*, 1S4 and 1S4*a*, 1S6 and 1S6*a*, and 1S7 and 1S7*a*; actuated by the energized relay 2S are the normally closed contact and arm 2S1 and 2S1*a* and the normally open contacts and arms 2S2 and 2S2*a*, 2S3 and 2S3*a* and 2S4 and 2S4*a*; and actuated by the energized relay 3S are the normally closed contact and arms 3S2' and 3S2*a*, 3S5 and 3S5*a* and 3S7 and 3S7*a* and the normally open contacts and arms, 3S1 and 3S1*a*, 3S2 and 3S2*a*, 3S3 and 3S3*a*, 3S4 and 3S4*a*, and 3S6 and 3S6*a*.

The relay arm 1S1*a* is grounded through a resistor R5 and the contact 1S1 is connected through the solenoid of a relay 4S to a source of D.C. current. Actuated by the energized relay 4S are normally closed contact and arm 4S1 and 4S1*a* and normally open contacts and arms 4S2 and 4S2*a*, and 4S3 and 4S3*a*. The relay contact 1S2 is connected through a pilot lamp to a terminal 26 of a current source, the arm 1S2*a* being connected to the opposite terminal 27 thereof. The contact 1S3 is connected to the contact 1S5 and the arm 1S3*a* is connected by way of the relay arm and contact 3S7*a* and 3S7 and a dropping resistor to ground; the contact 1S4 and the arm 1S4*a* are connected in series with an energizing current source and the solenoid of a time delay relay 5S, the energized relay closing normally open contacts 5S*a* which are connected to the normal forward speed terminals 18; the arm 1S5*a* is connected to the anode of tube V1 and to relay contact 3S1 and the contact 1S5 is connected to relay arm 3S1*a* and through the solenoid of relay 1S and a dropping resistor to relay arm 3S2a, the solenoid end of the resistor being grounded through a voltage regulator tube V4. The contact 1S6 is connected to relay arm 3S3a and the arm 1S6a is grounded through a resistor, and the contact and arm 1S7 and 1S7a are connected through a current source and a condenser to the solenoid of a relay 6S which is provided with momentarily closing contacts 6Sa connected to the deck stop terminals 17. The relay arm 2S1a is connected to the anode of tube V2 and contact 2S1 to contact 2S4 and solenoid terminals 2Sa of solenoid 2S, the other terminal thereof being connected by way of voltage regulator tube V5 to ground and by way of a resistor to the positive terminal 28 of a suitable voltage source, the negative terminal of which is grounded. The contact and arm 2S2 and 2S2a connect a pilot lamp to current terminals 26 and 27; contact and arm 2S3 and 2S3a are connected to a playout actuating means defining speaker actuating device or switch 29a or in series with the speaker, and the arm 2S4a is connected to ground by way of contact and arm 4S1 and 4S1a and a dropping resistor. The relay contact 3S2 is connected to a terminal 29 of an alternating current source the opposite terminal of which is grounded and the contact 3S2′ is connected to the positive voltage terminal 28; contact 3S3 is connected to contact 3S5 and one terminal of the solenoid of relay 3S the other terminal of which is connected by way of a resistor to D.C. terminal 28 and is grounded through the voltage regulator tube V6, the contact and arm 3S4 and 3S4a are connected to the rewind terminals 19; the arm 3S5a is connected to the anode of tube V3, and the contact and arm 3S5 and 3S5a connect a pilot lamp to the current terminals 26 and 27.

The control grid of each of the tubes V1, V2 and V3 is connected by way of a limiting resistor to the junction of the fixed resistor arms R1 and R2. The control grid of the tube V1 is connected in series with a resistor and the generator 23 to the arms of a potentiometer P1, the control grid of tube V2 is connected through a resistor to the arm of a potentiometer P2 and the control grid of the tube V3 is connected by way of a resistor to the arm of a potentiometer P3. The resistance elements of the potentiometers P1, P2 and P3 are each connected across a bias voltage supply 30, the positive terminal of which is grounded.

The potentiometers P1, P2 and P3 are adjusted so that the control grids of tubes V1, V2 and V3 are at successively higher cut off bias voltages. The rheostat R3 and tapped resistor R4 and the associated voltage supply 24 are so correlated with the tape 13 and reel 11, and the tube bias voltages adjusted so that the voltage from the bridge network is sufficient to fire tube V1 only when the tape reaches a position trailing the point thereon selected by the arm R4a a predetermined amount and fires the tube V2 when the tape position trails the selected point a short distance or coincides therewith and fires the tube V3 when the tape is in advance of the preselected point by an increment corresponding to about a tap distance on resistor R4 and a playback sequence on the tape 13.

Considering now the operation of the apparatus described above, when the bridge resistor arm R4a is switched to a tap corresponding to a point on the tape in advance of the current position of the tape, the signal or voltage from the bridge applied to the tube control grids is insufficient to fire any of the tubes V1, V2 or V3. As a result, the relay 4S solenoid is energized by way of closed contact and arm 1S1 and 1S1a closing contacts and arms 4S2 and 4S2a to energize the corresponding pilot light and 4S3 and 4S3a to close terminals 16 and actuate the fast wind and open contact and arm 4S1 and 4S1a to prevent the holding of relay 2S. As the tape advances it correspondingly varies the rheostat R3 by means of the Selsyns 21 and 22 increasing the bridge output voltage to a point sufficient to fire the tube V1, the cathode of which is grounded and the anode of which is connected by way of contact and arm 1S5 and 1S5a, relay 1S solenoid and contact and arm 3S2a and 3S2′ to the voltage positive terminal 28. The relay 1S is thus actuated opening contact and arm 1S1 and 1S1a to deactivate relay 4S to return the associated contacts and arms to their original positions previously described, closing the pilot light energizing contacts 1S2 and 1S2a, closing the hold contacts 1S3 and 1S3a to ground the lower end of the relay 1S through contacts 3S7 and 3S7a thereby maintaining the relay 1S actuated, closing contacts 1S7 and 1S7a to actuate relay 6S and momentarily short the terminals 17 and stop the tape drive, close terminals 1S4 and 1S4a to actuate the time delay relay 5S which after about a two second delay shorts the deck terminals 18 to drive the tape 13 at forward playing speed, opening the contacts 1S5 and 1S5a to remove the plate voltage from the anode of tube V1 and closing contacts 1S6 and 1S6a to permit the holding of relay 3S. It is important to note that although the tube V1 is always in ready position it is only momentarily ionized since the energizing of the relay 1S opens the plate voltage circuit to the tube anode and actuates the relay hold contacts. This is a highly desirable feature since it maintains the stability of the tube and insures a substantially constant required firing voltage for the control with a minimum of drift.

The rheostat further varies with the advancing tape to increase the bridge output voltage to a point sufficient to fire tube V2 to energize the relay 2S solenoid by way of the closed contacts 2S1 and 2S1a. The actuation of the relay 2S opens the contacts 2S1 and 2S1a to remove the plate voltage from tube V2, close the pilot light energizing contacts 3S2 and 3S2a, closes the speaker energizing contacts 2S3 and 2S3a to effect the play back of the selected portion of the tape 13 and closes hold contacts 2S4 and 2S4a to ground the low end of the relay 2S solenoid through the contacts 4S1 and 4S1a. When the tape 13 reaches the end of the selection the bridge output fires tube V3 to actuate relay 3S to rewind the tape as will be hereinafter set forth, to its initial selected position and repeat the cycle. Any conventional selectively operated means may be provided to stop the tape upon reaching the end of the selected portion without effecting rewinding.

When the selected point on the tape 13 trails the current position of the tape the bridge output fires the three tubes V1, V2 and V3 to actuate the corresponding relays 1S, 2S and 3S. The actuation of relay 3S closes contacts 3S1 and 3S1a to connect the low end of the relay 1S solenoid to the anode of V1 although the solenoid 1S is actuated, closes contacts 3S2 and 3S2a and opens contacts 3S2a and 3S2′ to switch the plate voltage of tube V1 from D.C. to A.C. so that the grid thereof is under continuous control, closes hold contacts 3S3 and 3S3a so that the low end of the relay 3S is grounded through closed contacts 1S6 and 1S6a, opens contacts 3S5 and 3S5a to open the circuit between the relay solenoid and tube V1 and remove the plate voltage therefrom, closes pilot light contacts 3S6 and 3S6a, opens contacts 3S7 and 3S7a which hold relay 1S and closes contacts 3S4 and 3S4a which shorts terminals 19 and actuates the tape rapid rewind. As the rheostat R3 reaches a point trailing the corresponding tape selected point, the tube V1 is extinguished by reason of its having an A.C. anode voltage and the bridge derived voltage being insufficient to fire the tube. The relay 1S is thus deactuated to open the contacts 1S6 and 1S6a to thereby deactuate the relay 3S and return it to its original position wherein the D.C. voltage is reapplied to tube V1 and the rewind contacts 3S4 and 3S4a are open and close contacts 1S1 and 1S1a and actuate the relay 4S to start the forward and play cycle in the manner previously set forth.

Figure 3:
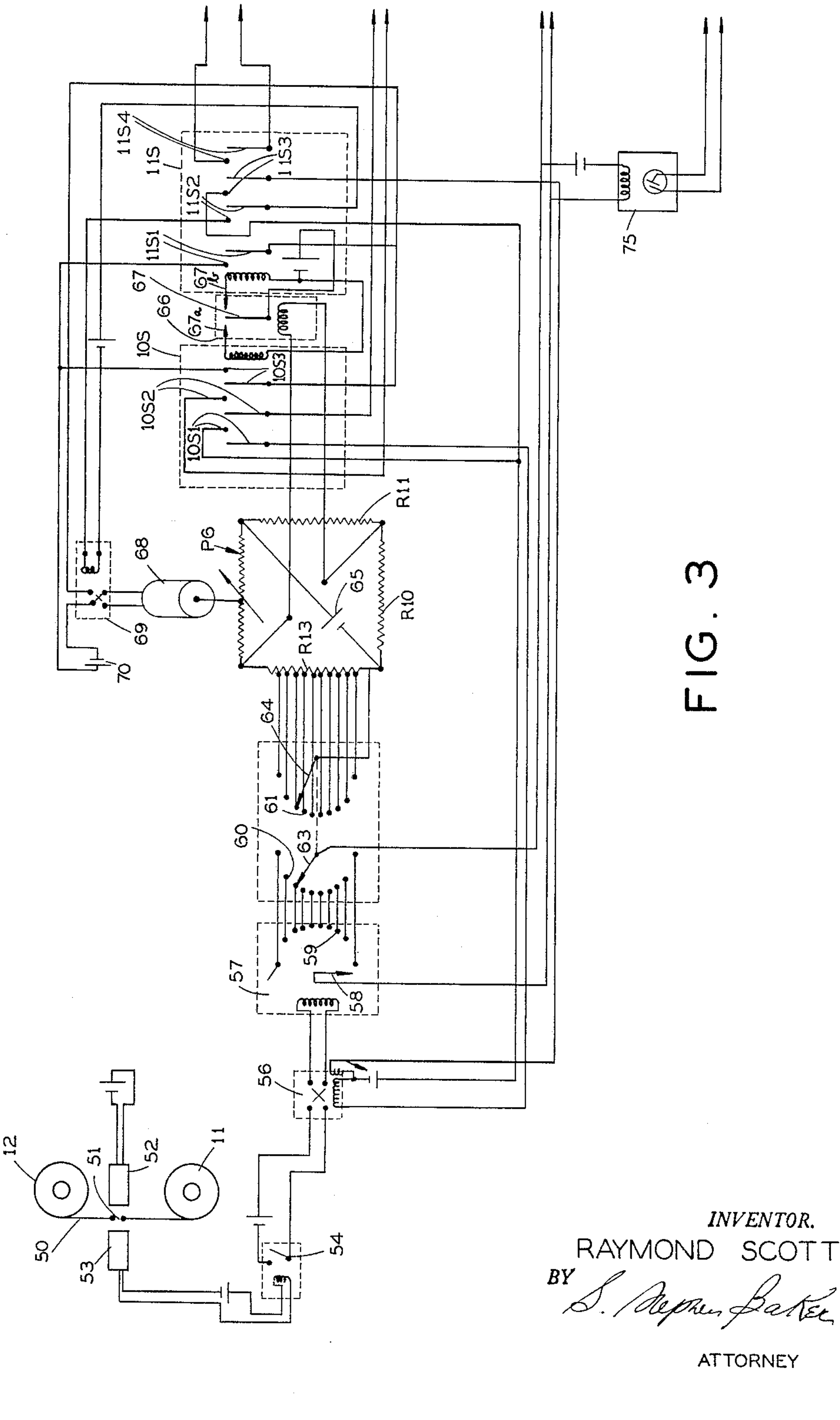
FIGURE 3 is a schematic diagrammatic view of another embodiment of the present invention.

FIGURE 3 of the drawing illustrates another embodiment of the present invention wherein the current position of the tape is determined by the counting of tape carried indicia and the position information is employed in a circuit to determine the required tape direction to reach a selected point. More particularly the tape 50 is transported by reels 11 and 12 on a deck 10 as in the previous embodiment and is provided with a series of spaced transparent spots 51 which trail each of the tape selections a predetermined distance. Directed toward one face of the tape 50 is a suitably energized light source 52 and disposed along the opposite face of the tape 50 is a photoelectric cell 53 which is energized by the light source 52 only when a transparent spot 51 is in registry therewith. The photoelectric cell 53 is connected by way of a current source to the solenoid of a sensitive relay 54 the normally open contacts of which are connected to the input terminals of a solenoid controlled reversing switch 56. The output terminals of the switch 56 are connected to the control terminals of a bidirectional stepping relay which includes an arm 58 and an associated plurality of contacts 59, the arm 58 being step advanced in accordance with the polarity of the pulse applied to the relay switch 57 as derived through the switch 56.

In order to effect the desired selection on the tape 50 there is provided a circuit network including a pair of ganged multitapped switches including separate sets of contacts 60 and 61 and mechanically coupled wiper arms 63 and 64 respectively associated therewith. The switch arms 63 and 64 are varied in unison in accordance with the desired selection and may be manually operated or automatically operated as by means of a telephone dial. Furthermore, each of the switch contacts 60 are connected to corresponding contacts 59 of the switch 57.

A bridge network includes a pair of adjacent fixed resistor arms R10 and R11 and an opposite pair of adjacent arms consisting of the resistor element of a potentiometer P6 and a variable multitapped resistor R13 the terminals of which are defined by an end of the resistance element thereof and the switch arm 64. The taps on the resistor R13 are connected to corresponding switch contacts 61. Connected to the remote ends of the bridge resistors R10 and R11 is a D.C. voltage source 65 and the opposite ends of the bridge network are connected to the control terminals of a polarized relay 66 which may be of the galvanometer type and includes an arm 67 and contacts *67a* and *67b*. The arm of the potentiometer P6 is controlled by a bidirectional motor 68 which is connected through a reversing switch 69 to a D.C. power source 70 as will be hereinafter set forth.

A pair of relays 10S and 11S have one terminal of each of their actuating solenoids connected to relay contacts *67a* and *67b* respectively and the other terminals connected through a current source to the relay arm 67. Thus an unbalance of the bridge will close either contact *67a* or *67b* depending on the direction of unbalance of the bridge to alternatively actuate the relay 10S or 11S. Associated with the relay 10S are normally open contact pairs 10S1, 10S2 and 10S3 and with the relay contact pair 11S1, 11S2, 11S3 and 11S4. One of the contacts 10S1 is connected to one terminal of one of the relay 56 solenoids, the other terminal of which is connected through a current source to the other contact 10S1 and one contact 11S3 and through the other switch 56 solenoid to the other contact 11S3. The contact pair 10S2 are connected across the deck rewind terminals 19 and the contact pair 10S3 are connected through the D.C. power supply to the input terminals of the reversing switch 69, the output terminals of which are connected to the motor 68 terminals. The contact pair 11S1 are connected in parallel with the contact pair 10S3, the contacts 11S2 are connected through a power supply to the switch 69 reversing solenoid; and the contacts 11S4 are connected across the fast forward deck terminals 16. The switch arms 58 and 63 are connected to respective deck stop terminals 17 and through a power supply to the actuating solenoid of a time delay relay 75, the normally open contacts of which are connected to the playing speed deck terminals 18.

Considering now the operation of the apparatus last described and assuming that it is desired to play back a selection in advance of the current position of the tape the switch arms 63 and 64 are moved to the desired positions, the switch 64 unbalancing the bridge from its previously balanced position in a direction so that the output signal actuates the relay 66 to close contacts 67 and *67b*, and actuates the relay 11S and close the associated relay contacts.. Closed contacts 11S2 energize the switch 69 solenoid and closed contacts 11S1 connect the power supply 70 to the switch 69 terminals to slowly drive the motor 68 in a forward direction and with it the potentiometer P6 arm. The closed contacts 11S3 energize the corresponding switch 56 solenoid so that the relay 57 steps in a forward direction when actuated and the closed contacts 11S4 actuate the deck fast forward motion. As the tape 50 advances and successive transparencies 51 are brought into registry with the photoelectric cell 53, the relay 54 and switch 57 are correspondingly pulsed until the arm 58 is brought into engagement with a tap 59 corresponding with a selected tap 60 to short the stop terminals 18 to stop the reels and to actuate the relay 75 which a short time thereafter, about two seconds, shorts the deck forward play terminals 18 to initiate the play back of the desired tape selection. The potentiometer P6 arm is advanced until the bridge is balanced, corresponding to the current tape selected position to open the relays 66 and 11S and the associated contacts whereby to de-energize the motor 68, switch 56 solenoid and open terminals 16 and 19. It should be noted that the bridge assumes the position of the tape so as to control the tape direction upon a further selection. Thus the bridge acts as a direction sensing device.

When the selected point on the tape trails the current position of the tape, the bridge output actuates switch 66 solenoid to close contacts *67a* and 67, actuating the relay 10S and closing the corresponding contacts. The closed contacts 10S1 reverses the switch 56 so that switch 57 steps in a backward direction; the closed contacts 10S2 shorts the rewind terminals 19 to rapidly rewind the tape and the closed contacts 10S3 energize the motor 68 in a reverse direction. The subsequent operation is then similar to that described above.

Figure 4:
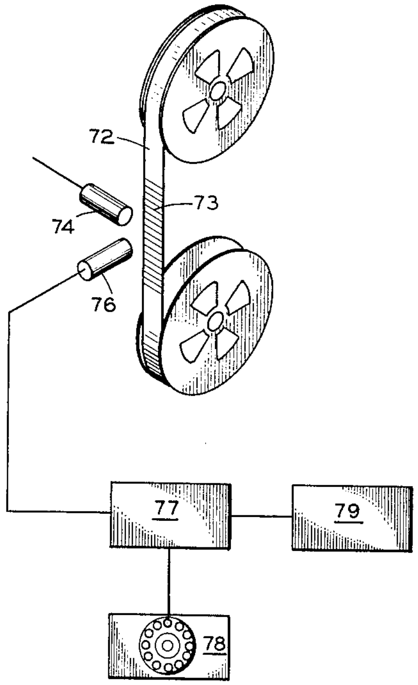
FIGURE 4 is a diagrammatic view of still another embodiment of the present invention.

In FIGURE 4 of the drawing there is illustrated an apparatus in which the position of the tape is determined by counting light reflecting areas carried at predetermined spaced points on the tape. Specifically the tape 72 carries suitable light reflecting spots in areas 73 at regularly spaced positions along the tape. A light 74 and a photoelectric cell 76 are directed toward the tape 72 so that the cell 76 generates a pulse when in registry with a spot 73. The output of the cell 76 is counted by a bidirectional electronic counter 77 of any well-known type, the direction of which is controlled in any suitable manner by the direction of movement of the tape. The information derived from the counter 77 is then compared with information relating to the selected tape position as derived from a suitable device 78 and a signal generated and fed to the deck control device 79 which in turn controls the tape movement and playing in the manner of the earlier embodiments.

Figure 5:
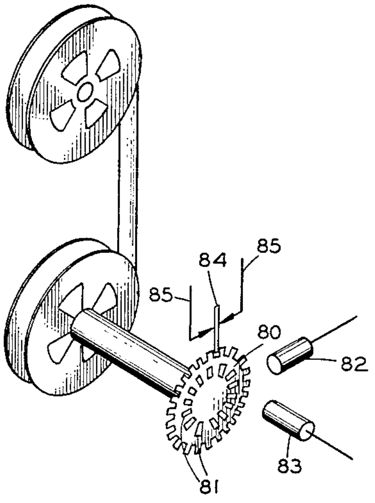
FIGURE 5 is a diagrammatic view of a further embodiment of the present invention.

The apparatus illustrated in FIGURE 5 of the drawings employs a conventional recording tape without any modification thereof, the tape position being determined by marked disc 80 driven directly by or in synchronism with the take up reel. The disc 80 is provided with regularly circumferentially spaced light reflecting areas 81 and a serrated periphery. A light 82 and a photoelectric cell 83 are directed at the face of the disc 80 so that the rotating disc generates pulses which are derived from the cell 83 and counted in any desired manner, for example in the fashion of the last described embodiments. The direction of counting is controlled by means of a resilient contact arm 84 whose free end engages the disc serrated edge and is swung into alternative engagement with one of a pair of oppositely disposed registering contacts 85. The arm 84 and contacts 85 are connected to the counting mechanism to vary the direction thereof to correspond to that of the tape. The counted pulses, which are an indication of the tape position may be employed in transporting the tape to a selected point in the manner described earlier.

It should be noted that the various control and counting stages described above may be interchanged and that other types of counting devices may be employed either mechanical, electromechanical or electronic.

While there have been described and illustrated preferred embodiments of the present invention it is apparent that numerous alterations, additions and omissions may be made without departing from the spirit thereof.

What is claimed is:

1. An improved apparatus for use with a tape transport device having a fast wind, a fast rewind and a slow forward control and for transporting said tape to a preselected point comprising means for generating a signal including a bridge network provided with a first resistor arm variable in accordance with said preselected point and a second resistor arm variable in accordance with the position of said tape, means responsive to said signal to alternatively actuate said fast wind or fast rewind control to transport said tape toward said preselected point and means actuating said slow forward control upon said tape reaching the vicinity of said preselected point.

2. An improved apparatus for use with a tape transport device having a fast wind, a fast rewind and a slow forward control and for transporting said tape to a preselected point comprising means for generating a signal including a bridge network provided with a first resistor arm variable in accordance with said preselected point and a second resistor arm variable in accordance with the position of said tape, means responsive to said signal to alternatively actuate said fast wind or said rewind control and means actuating said slow forward control upon said tape reaching a point trailing said preselected point a predetermined distance.

3. An improved apparatus in accordance with claim 2 wherein said forward control actuating means is responsive to said signal.

4. An improved apparatus in accordance with claim 2 including a playout actuating means actuated in response to said signal.

5. An improved apparatus for use with a tape transport device having a fast wind, a fast rewind and a slow forward control and for transporting said tape to a preselected point, a first relay for alternatively actuating said fast wind control and said slow forward control and having a first solenoid, a second relay for actuating a play out control and having a second solenoid, a third relay for actuating said fast rewind and including a third solenoid, first, second and third gas discharge tubes having output electrodes and control grids, a first voltage source, means connecting said tube output electrodes through said respective solenoids across said first voltage source, means for applying sucessively greater cut off bias voltages to said first, second and third control grids and means for applying a common input signal to said control grids in accordance with the relationship of said preselected point and the position of said tape, said signal being sufficient to fire said three tubes upon said tape position being in advance of said preselected point, to fire said first and second tubes only upon said tape position substantially coinciding with said preselected point, sufficient to fire only said first tube upon the position of said tape trailing said preselected point a predetermined distance.

6. An improved apparatus for use with a tape transport device having a fast wind, a fast rewind and a slow forward control and for transporting said tape to a preselected point, a first relay for alternatively actuating said fast wind control and said slow forward control and having a first solenoid, a third relay for actuating a play out control and having a second solenoid, a third relay for actuating said fast rewind and including a third solenoid, first, second and third gas discharge tubes having output electrodes and control grids, a first voltage source, means connecting said tube output electrodes through said respective solenoids across said first voltage source means for applying successively greater cut off bias voltages to said first, second and third control grids and means for applying a common input to said control grids in accordance with the relationship of said preselected point and the position of said tape, said signal being sufficient to fire said three tubes upon said tape position being in advance of said preselected point, to fire said first and second tubes only upon said tape position substantially coinciding with said preselected point, sufficient to fire only said first tube upon the position of said tape trailing said preselected point a predetermined distance, said signal applying means including a bridge network having a first resistor arm variable in accordance with said preselected point and a second resistor variable in accordance with the position of said tape.

7. An improved apparatus in accordance with claim 6 including means for varying the bias on said control grid in accordance with the speed of movement of said tape.

8. An improved apparatus in accordance with claim 6 wherein at least one of said tube output terminals is connected to said voltage source through a corresponding relay solenoid by way of a first pair of normally closed contacts actuated by said relay and a second pair of normally open contacts actuated by said relay and connecting said solenoid to a source of energizing current.

9. An improved apparatus in accordance with claim 8 wherein said solenoid is connected to said energizing current source through said second contacts in series with a third pair of contacts actuated by another of said solenoids.

10. An improved apparatus in accordance with claim 6 including a second source of alternating current, and means alternatively connecting said first tube output terminals through said first solenoid to cross said first or second current sources and actuable by another of said relays.

11. An improved apparatus for use with a tape transport device having a fast wind, a fast rewind and a slow forward control and for transporting said tape to a preselected point, said tape carrying spaced indicia along the length thereof comprising means for sensing said indicia means responsive to said sensing for counting said indicia as said tape moves and accumulating said counts in accordance with the direction of movement of said tape, means generating a signal including a bridge network having a first variable resistor arm and a second rheostat arm and selectively operable means for adjusting the resistance of said first arm in accordance with said selected point and means automatically regulating the resistance of said second arm to balance said bridge and means alternatively actuating said rewind and wind controls in accordance with said signal.

12. An improved apparatus in accordance with claim 11 wherein said sensing means includes a light source and a photoelectric cell directed at said tape, said tape carried indicia varying the light reaching said cell.

13. An improved apparatus in accordance with claim 11 wherein said count accumulating means includes a bidirectional solenoid operated stepping switch actuated by said sensing means and means controlling the direction of said stepping in accordance with the direction of movement of said tape.

14. An improved apparatus in accordance with claim 11 wherein said control actuating means includes a pair of relays alternatively actuated in accordance with the same of the signal from said bridge.

15. An improved apparatus in accordance with claim 11 including means responsive to said counting means for actuating said slow forward control.

References Cited in the file of this patent

UNITED STATES PATENTS

| | | |
|---|---|---|
| 1,646,444 | Carpe et al. | Oct. 25, 1927 |
| 1,901,663 | Minkler | Mar. 14, 1933 |
| 2,607,902 | Townsend | Aug. 19, 1952 |
| 2,683,568 | Lindsay | July 13, 1954 |
| 2,797,368 | Holden | June 25, 1957 |
| 2,919,382 | Saxenmeyer | Dec. 29, 1959 |